(12) United States Patent
Rowe

(10) Patent No.: US 6,394,907 B1
(45) Date of Patent: May 28, 2002

(54) CASHLESS TRANSACTION CLEARINGHOUSE

(75) Inventor: Richard E. Rowe, Reno, NV (US)

(73) Assignee: International Game Technology, Reno, NV (US)

( * ) Notice: Subject to any disclaimer, the term of this patent is extended or adjusted under 35 U.S.C. 154(b) by 0 days.

(21) Appl. No.: 09/648,382

(22) Filed: Aug. 25, 2000

Related U.S. Application Data
(60) Provisional application No. 60/200,329, filed on Apr. 28, 2000.

(51) Int. Cl.[7] ................................................ A63F 13/00
(52) U.S. Cl. ............................ 463/42; 463/25; 463/20; 463/16; 273/143 R; 902/23
(58) Field of Search .............................. 463/42, 41, 40, 463/25, 20, 19, 18, 17, 16, 12, 13; 700/91, 92, 93; 273/143 R, 138.1, 138.2; 705/1, 14; 235/379, 375, 380, 382, 381; 902/23

(56) References Cited

U.S. PATENT DOCUMENTS

| | | | | |
|---|---|---|---|---|
| 5,038,022 A | * | 8/1991 | Lucero | |
| 5,119,295 A | * | 6/1992 | Kapur | |
| 5,265,874 A | * | 11/1993 | Dickinson et al. | |
| 5,429,361 A | * | 7/1995 | Raven et al. | |
| 5,643,086 A | | 7/1997 | Alcorn et al. | 463/29 |
| 5,761,647 A | | 11/1998 | Boushy | 705/10 |
| 6,012,832 A | * | 1/2000 | Saunders et al. | |
| 6,048,269 A | * | 4/2000 | Burns et al. | |
| 6,104,815 A | | 8/2000 | Alcorn et al. | 380/251 |
| 6,106,396 A | | 8/2000 | Alcorn et al. | 463/29 |
| 6,149,522 A | | 11/2000 | Alcorn et al. | 463/29 |

* cited by examiner

Primary Examiner—Michael O'Neill
(74) Attorney, Agent, or Firm—Beyer Weaver & Thomas LLP

(57) ABSTRACT

A disclosed cashless instrument transaction clearinghouse provides clearinghouse server including a network interface allowing the cashless instrument transaction clearinghouse to communicate with a number of gaming properties and a processor configured to enable the validation of cashless instruments at a gaming property different from where the cashless instrument was generated. Methods are provided at the cashless instrument transaction clearinghouse and at the gaming properties that enable cashless instrument transactions across multiple gaming properties. In addition, methods are provided at the cashless instrument transaction clearinghouse that allow 1) progressive games based upon cashless instrument transactions and 2) multi-site gaming promotions using cashless instruments.

45 Claims, 8 Drawing Sheets

CASHLESS TRANSACTION CLEARINGHOUSE

CROSS-REFERENCE TO RELATED APPLICATIONS

This application claims priority under 35 U.S.C. §119(e) from co-pending U.S. Provisional Patent Application No. 60/200,329, filed Apr. 28, 2000, naming Rick Rowe as inventors, and titled "AN AWARD TICKET CLEARING-HOUSE."

BACKGROUND OF THE INVENTION

This invention relates to game playing services for gaming machines such as slot machines and video poker machines. More particularly, the present invention relates to methods of utilizing cashless instruments on gaming machines.

There are a wide variety of associated devices that can be connected to a gaming machine such as a slot machine or video poker machine. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

As technology in the gaming industry progresses, the traditional method of dispensing coins or tokens as awards for winning game outcomes is being supplemented by ticket dispensers which print ticket vouchers that may be exchanged for cash or accepted as credit of indicia in other gaming machines for additional game play. An award ticket system, which allows award ticket vouchers to be dispensed and utilized by other gaming machines, increases the operational efficiency of maintaining a gaming machine and simplifies the player pay out process. An example of an award ticket system is the EZ pay ticket system by International Game Technology of Reno, Nev. Award ticket systems and systems using other cashless mediums are referred to as cashless systems.

Cashless systems, such as the EZ pay ticket system, provide advantages to both game players and casino operators. For example, many players find it more convenient to carry an award ticket than a large number of coins. For gaming machine operators cashless systems tend to reduce gaming machine operating costs. For example, the infrastructure needed to remove and count indicia of credit (e.g. coins, tokens, bills) from the gaming machine may be eliminated or minimized when it is replaced with a cashless system, which reduces the gaming machine operating costs. Further, coin dust, which is potentially damaging to the components of the gaming machine (e.g. electronic components) may be eliminated or minimized when coin acceptors are replaced with the cashless system.

Currently, cashless systems have become very popular and have been embraced by customers. For example, ticket vouchers that are generated upon cashout and redeemed for cash or gaming machine credits within a particular casino are well accepted by game players. However, the ticket vouchers are only redeemable at the casino or the local property where the ticket was generated. Thus, the customer is not allowed to take the ticket voucher generated at one casino property and redeem the ticket voucher at another casino property. The limited redemption capabilities of cashless systems, including ticket vouchers, may be undesirable to an entertainment corporation that owns multiple casino properties. The entertainment corporation may desire that their customers have the ability to take a ticket voucher generated in one property to any of the other properties owned by the entertainment corporation.

Also, multi-site cashless capabilities may be desirable for an area or region such as the Las Vegas strip where a customer could cash out in casino A where a ticket voucher is generated. The customer could then take this ticket down the Las Vegas strip and into casino B where it could be inserted into a gaming machine's bill acceptor and redeemed for credit. In this example, casino A and casino B may or may not be owned by the same entertainment corporation. This type of multi-site validation capability is not possible with current cashless systems. Thus, in view of the above, it would be desirable to provide apparatus and methods for cashless systems that allow a cashless medium, including an award ticket voucher, generated at one site using one type of cashless system to be validated at a second site using the same or a different cashless system.

SUMMARY OF THE INVENTION

This invention addresses the needs indicated above by providing a cashless instrument transaction clearinghouse including a network interface allowing the cashless instrument transaction clearinghouse to communicate with a number of gaming properties and a processor configured to enable the validation of cashless instruments at a gaming property different from where the cashless instrument was generated. Methods are provided at the cashless instrument transaction clearinghouse and at the gaming properties that enable cashless instrument transactions across multiple gaming properties. In addition, methods are provided at the cashless instrument transaction clearinghouse that allow 1) progressive games based upon cashless instrument transactions and 2) multi-site gaming promotions using cashless instruments.

One aspect of the present invention provides a cashless instrument transaction clearinghouse for facilitating the use of cashless instruments across separate gaming properties, each of which generates and validates cashless instruments. The cashless instrument transaction clearinghouse may be generally characterized as including: 1) a network interface allowing the cashless instrument transaction clearinghouse to communicate with each of the separate gaming properties; and 2) a processor configured or designed to (i) receive cashless instrument validation requests via the network interface from a first property for a cashless instrument presented at the first property where the cashless instrument was generated at a second property (ii) send information, via the network, to the second property requesting the second property to approve or reject the cashless instrument validation request. The cashless instrument may selected from the group consisting of a smart cart card, a debit card, a bar-coded ticket and an EZ pay ticket voucher. Further, the processor may communicate via the network interface with a first cashless system at a first property and a second cashless system at a second property where the second cashless system is different from the first cashless system.

In specific embodiments, the cashless instrument transaction clearinghouse may include a transaction database containing cashless instrument transaction information, a router and a memory. The transaction database may be partitioned according to properties where access to a partition of the transaction database is limited to an owner of the property corresponding to the partition of the transaction database. The router may contain routing information allowing the processor to: 1) determine the property where the cashless instrument was generated and send information to the property where the cashless instrument was generated. The memory may contain software allowing the processor to: 1) operate multiple progressive games associated with cashless instrument transactions across separate gaming properties; 2) to operate multiple promotions associated with cashless instrument transactions across the separate gaming properties; and to graphically analyze the cashless instrument transaction information stored in a transaction database and generate accounting reports based upon the cashless instrument transaction information.

In another aspect, the invention provides a method of validating a cashless instrument at a first property using a cashless instrument transaction clearinghouse where the cashless instrument was generated at a second property. The method may be characterized as including: 1) receiving a first transaction validation request containing transaction information from the first property wherein the first transaction validation request requests approval of a cashless instrument transaction; 2) sending a second transaction validation request to the second property; 3) receiving a first transaction validation reply from the second property; and 4) sending a second transaction validation reply to the first property wherein the second transaction validation reply contains transaction information indicating the cashless instrument transaction has been approved or has been rejected. The first transaction validation request may be an information packet. The transaction information may be selected from the group a value, an issue date, an issue time, a transaction number, a machine identification number, an issue location, an owner, a transaction approval and a transaction rejection.

In a specific embodiment, the method of validating a cashless instrument may include: 1) generating a sequence of one or more random numbers; 2) comparing the sequence of random numbers to a sequence of numbers contained within the transaction information; 3) when the sequence of random number matches the sequence of numbers contained within the transaction information, generating an award message indicating a prize has been awarded; and 4) sending the award message to the first property. In addition, the method of validating a cashless instrument may include: a) when the cashless instrument transaction is approved, charging an amount to property owner; b) when the cashless instrument transaction is approved, deducting a percentage of a value contained on the cashless instrument and storing the percentage of the value in a transaction database; c) when a cashless instrument transaction is approved, storing transaction information to a transaction database; d) generating a transaction validation reply; e) generating a transaction validation request; and f) determining the property where the cashless instrument was generated from the transaction information.

Another aspect of the present invention provides a method of validating a cashless instrument presented at a first property using a cashless server at the first property connected to a cashless instrument transaction clearinghouse where the cashless instrument was generated at a second property. The method may be generally characterized as including: 1) sending a transaction validation request containing transaction information to the cashless instrument transaction clearinghouse where the transaction validation request requests approval of the cashless instrument transaction at the cashless transaction validation site; and 2) receiving a transaction validation reply from the cashless instrument transaction clearinghouse where the transaction validation reply contains information indicating the cashless instrument transaction has been approved or has been rejected. Further, the method may include: a) receiving a first transaction validation request containing transaction information from a cashless instrument transaction validation site on the first property where the first transaction validation request requests approval of a cashless instrument transaction; and 2) sending a second transaction validation reply to the cashless instrument validation site where the second transaction validation reply contains information indicating the cashless instrument transaction has been approved or has been rejected. The cashless instrument validation site may be selected from the group consisting of a gaming machine, a cashier station, a wireless validation device and a clerk validation terminal.

In yet another aspect of the present invention, a method of validating a cashless instrument presented at a first property using a cashless server at a second property connected to a cashless instrument transaction clearinghouse where the cashless instrument was generated at the second property is provided. The method may be characterized as including: 1) receiving a transaction validation request from the cashless instrument transaction clearinghouse where the transaction validation request requests approval of the cashless instrument transaction at the cashless transaction validation site; and 2) sending a transaction validation reply containing transaction information to the cashless instrument transaction clearinghouse where the transaction validation reply contains transaction information indicating the cashless instrument transaction has been approved or has been rejected. The method may also include: a) sending an electronic find transfer to the cashless instrument transaction clearinghouse; b) receiving an acknowledgement message from the cashless instrument transaction clearinghouse when the cashless instrument transaction is completed at the first property and; c) sending a non-acknowledgement message to the cashless instrument transaction clearinghouse when the cashless instrument transaction is rejected at the cashless server.

DESCRIPTION OF THE PREFERRED EMBODIMENTS

Figure 1:
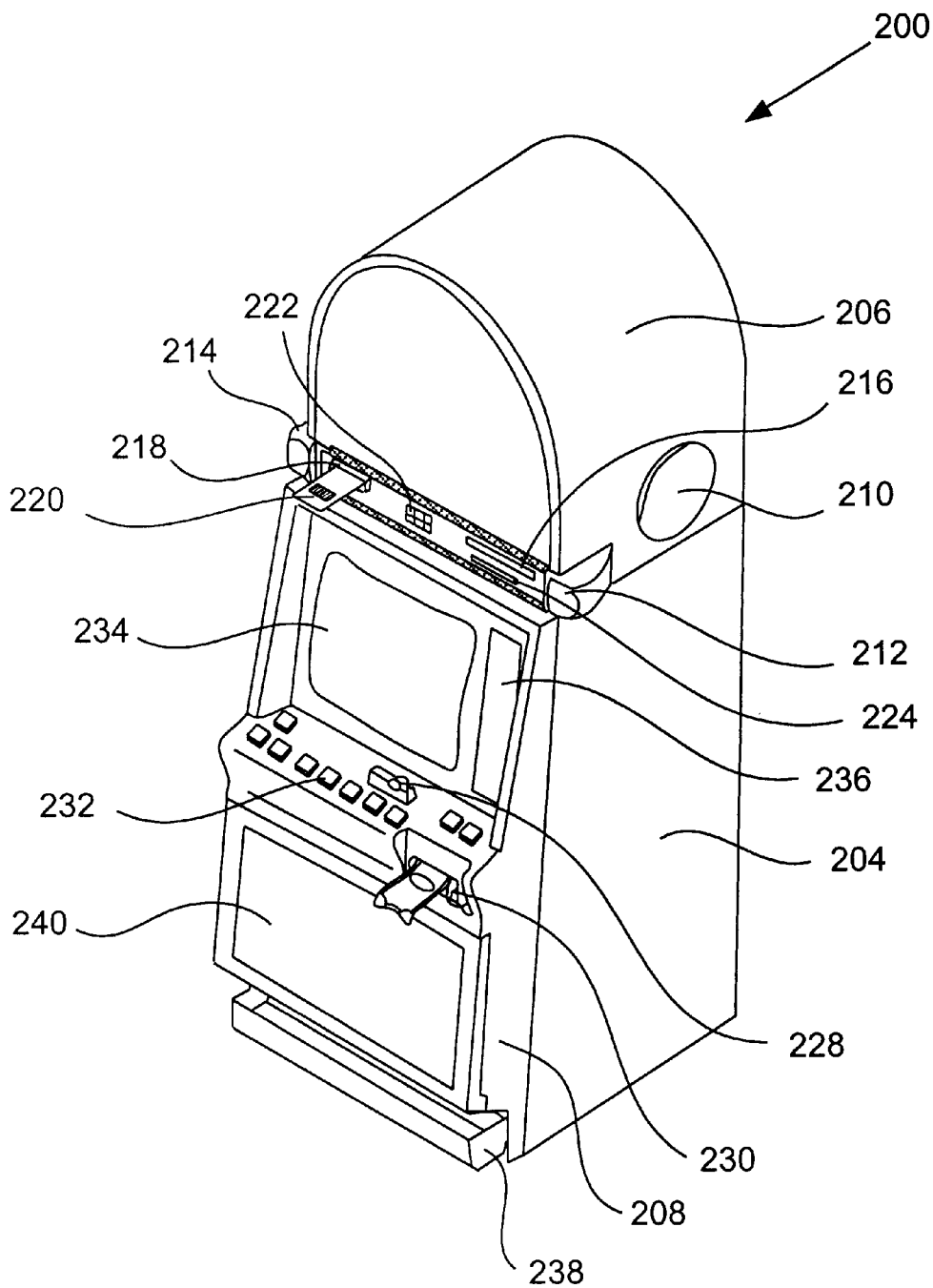
FIG. 1 is a perspective drawing of a gaming machine having a top box and other devices.

Turning first to FIG. 1, a video gaming machine 200 of the present invention is shown. Machine 200 includes a main cabinet 204, which generally surrounds the machine interior (not shown) and is viewable by users. The main cabinet includes a main door 208 on the front of the machine, which opens to provide access to the interior of the machine. Attached to the main door are player-input switches or buttons 232, a coin acceptor 228, and a bill validator 230, a coin tray 238, and a belly glass 240. Viewable through the main door is a video display monitor 234 and an information panel 236. The display monitor 234 will typically be a cathode ray tube, high resolution flat-panel LCD, or other conventional electronically controlled video monitor. The information panel 236 may be a back-lit, silk screened glass panel with lettering to indicate general game information including, for example, the number of coins played. The bill validator 230, player-input switches 232, video display monitor 234, and information panel are devices used to play a game on the game machine 202. The devices are controlled by circuitry (not shown) housed inside the main cabinet 204 of the machine 200. Many possible games, including traditional slot games, video slot games, video poker, and video keno, may be provided with gaming machines of this invention.

The gaming machine 200 includes a top box 206, which sits on top of the main cabinet 204. The top box 206 houses a number of devices, which may be used to add features to a game being played on the gaming machine 200, including speakers 210, 212, 214, a ticket printer 218 which may print bar-coded tickets 220, a key pad 222 for entering player tracking information, a florescent display 216 for displaying player tracking information, a card reader 224 for entering a magnetic striped card containing player tracking information. Further, the top box 206 may house different or additional devices than shown in FIG. 1. For example, the top box may contain a bonus wheel or a back-lit silk screened panel which may be used to add bonus features to the game being played on the gaming machine. During a game, these devices are controlled and powered, in part, by circuitry (not shown) housed within the main cabinet 204 of the machine 200.

Understand that gaming machine 200 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present invention, as described below, can be deployed on most any gaming machine now available or hereafter developed.

Returning to the example of FIG. 1, when a user wishes to play the gaming machine 200, he or she inserts cash through the coin acceptor 228 or bill validator 230. In addition, the player may use a cashless instrument of some type to register credits on the gaming machine 200. For example, the bill validator 230 may accept a printed ticket voucher, including 220, as an indicia of credit. As another example, the card reader 224 may accept a debit card or a smart card containing cash or credit information that may be used to register credits on the gaming machine. Typically, the information contained on the cashless instrument, including the ticket voucher, smart card or debit card, is validated by a cashless system. The cashless instrument, including the ticket voucher, smart card or debit card, may have been generated at the same property, for example a first casino where the gaming machine 200 is located or the ticket may have been generated at another property for example a second casino. Details of the components of a cashless system and validation methods used in a preferred embodiment of a cashless system are described with reference to FIGS. 2–7.

The cashless instrument typically contains information used to register credits on the gaming machine, including gaming machine 200, and validate the registration transaction. For example, when a ticket voucher is used as a cashless instrument, the printed ticket voucher may contain information including: 1) a ticket value, 2) a ticket issue date, 3) a ticket issue time, 4) a ticket transaction number, 5) a machine ID, 6) a ticket issue location and 7) a ticket owner. Information such as the ticket value, the ticket issue date, the ticket issue time, the ticket number and the machine ID may be common to cashless systems that generate and validate tickets issued at a single property. However, information such as the ticket issue location and the ticket owner may be needed to allow multi-site generation and validation of cashless instruments. In addition, other types of information, besides the information listed above, may be stored on the cashless instrument. For example, the ticket may contain information regarding a promotional prize that may be won by the player when the ticket voucher is utilized in the gaming machine 200. The promotional prize may involve multiple properties and particular types of gaming machines.

The information on the cashless instrument may be recorded on the cashless instrument when the cashless instrument is generated. For example, in the case of the ticket voucher, the generation of the ticket voucher may refer to the actual printing of the ticket voucher on paper or some other medium. A unique bar-code may be printed on the ticket voucher which may be read with a bar-code scanner to obtain information from the ticket. The ticket voucher, including 220, may be printed from a printer, including printer 218. In the case of the smart card or debit card, the generation of the smart card or debit card refers to storing or encoding this information on the smart card or debit card. The generation of the debit card or smart card may occur when the smart card or debit card is inserted into the card reader 224 in the gaming machine 200 or at another site where smart cards or debit cards are issued. For example, smart cards or debit cards may be generated at ATM like terminals, at a cashier station when a player cashes out or prepaid smart cards or debits may be purchased within the gaming property (e.g. casino).

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 232, the video display screen 234 or using some other device which enables a player to input information into the gaming machine. During certain game events, the gaming machine 200 may display visual and auditory effects that can be perceived by the player. These effects add to the excitement of a game, which makes a player more likely to continue playing. Auditory effects include various sounds that are projected by the speakers 210, 212, 214. Visual effects include flashing lights, strobing lights or other patterns displayed from lights on the gaming machine 200 or from lights behind the belly glass 240.

After the player has completed a game, a cashless instrument may be generated at the gaming machine 200. The cashless instrument may be a printed ticket voucher, a smart card, debit card or other cashless medium. For example, the player may decide to cashout and may receive the ticket 220 from the printer 218, which may be used for further games or to redeem a prize. Further, the player may receive a ticket 220 for food, merchandise, game services or other promotions from the printer 218 that may be used at the gaming property where the gaming machine is located or at other gaming properties. The player may view cashless instrument transaction information on the video display screen 234 or the florescent screen 216. For instance, when a player cashes out from the gaming machine, the value stored on the cashless instrument may be displayed using the video display 234. As another example, when a promotion ticket 220 is printed out from the printer 218 that is valid at a number of other gaming properties, a map may be displayed on the video display screen indicating where the other gaming properties are located.

Figure 2:
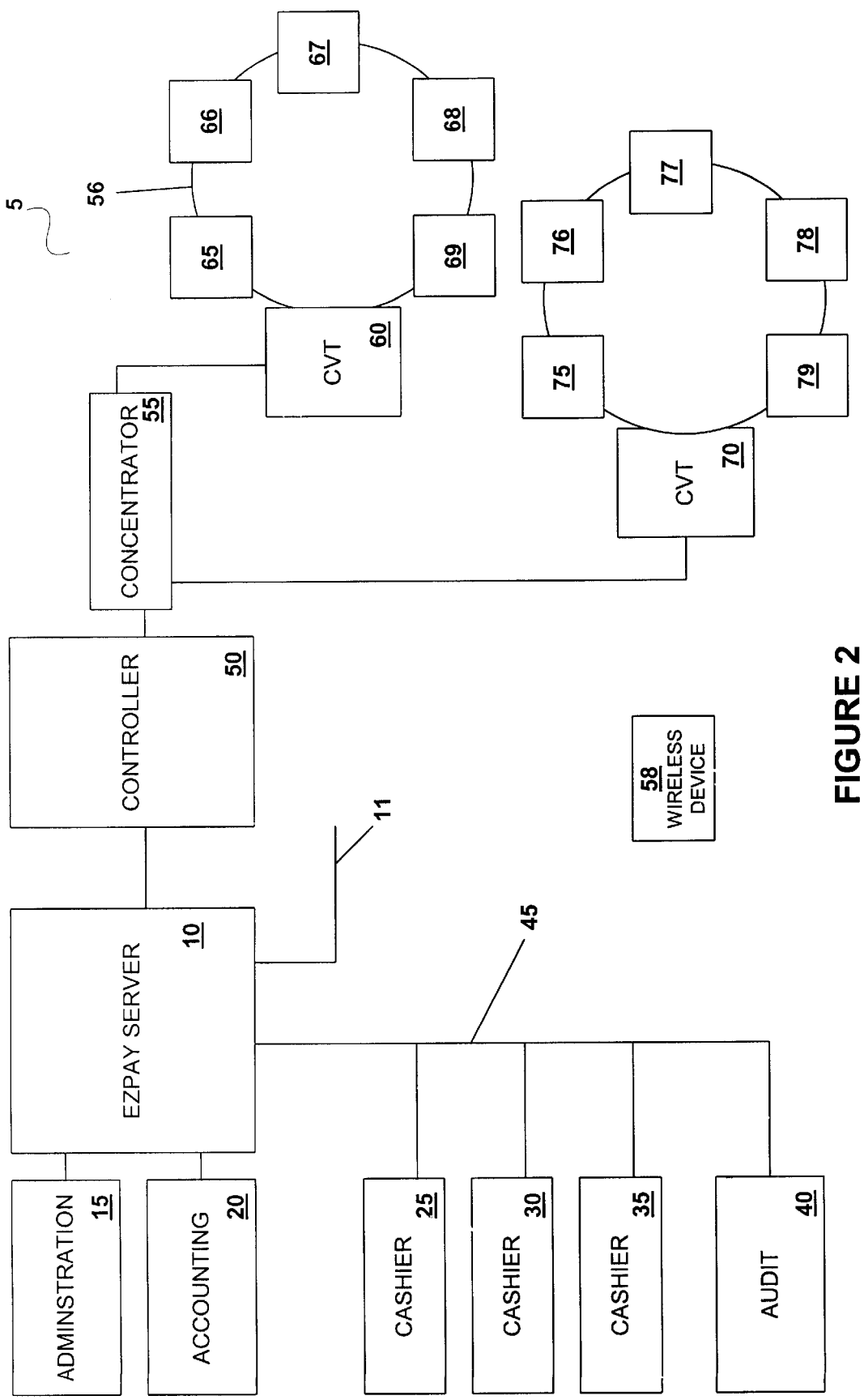
FIG. 2 is a block diagram of the components of an cashless system using the EZ pay ticket voucher system.

FIG. 2 is a block diagram of the components of a cashless system using the EZ pay ticket voucher system for one embodiment of the present invention. A cashless system is the hardware components and software components needed to generate and validate cashless instruments. Components of an cashless system may include 1) data acquisition hardware, 2) data storage hardware, 3) cashless instrument generation and validation hardware (e.g. printers, card readers, ticket acceptors, validation terminals, etc.), 3) auditing software, 4) cashless instrument validation software and 5) database software. Many types of cashless systems are possible and are not limited to the components listed above or embodiments such as the EZ pay ticket voucher system. Typically, an cashless system is installed at each property utilizing cashless instruments. To allow multi-site validations of cashless instruments, the cashless systems at each property are linked to a cashless instrument transaction clearinghouse. The relation of multiple cashless systems connected to a cashless instrument transaction clearinghouse are described with reference to FIG. 3. The details of an cashless system at one property are described below with reference to FIG. 2.

Returning to FIG. 2, a first group of gaming machines, 65, 66, 67, 68, and 69 is shown connected to a first clerk validation terminal (CVT) 60 and a second group of gaming machines, 75, 76, 77, 78 and 79 is shown connected to a second CVT 70. All of the gaming machines print ticket vouchers which may be exchanged for cash or accepted as credit of indicia in other gaming machine located within the property 5. In this example, the ticket voucher serves as a cashless instrument. In addition, the gaming machines may accept ticket vouchers issued at a different property from property 5 where the different property utilizes the same or a different cashless system as compared to property 5.

When the CVTs are not connected to one another, a ticket voucher printed from one gaming machine may be only be used as indicia of credit in another gaming machine which is in a group of gaming machines connected to the same clerk validation terminal. For example, a ticket voucher printed from gaming machine 65 might be used as credit of indicia in gaming machines 66, 67, 68 and 69, which are each connected to the CVT 60, but not in gaming machines 75, 76, 77, 78, and 79, which are each connected to the CVT 70. In an analogous manner, when the cashless systems from one property are not connected together then a ticket vouchers generated from gaming machine 66 may be not be used at property different from property 5.

The CVTs, 60 and 70, store cashless instrument transaction information corresponding to the outstanding cashless instrument, including ticket vouchers, smart cards and debit cards, that are waiting for redemption. In this embodiment, the CVTs are separate from the gaming machine. However, the cashless instrument information may be also be stored within each gaming machine or one gaming machine may functionally act as a CVT for a group of gaming machines eliminating the separate CVT hardware. In addition, cashless instrument transaction information may be stored in a cashless server including the EZ pay server 10. The cashless instrument transaction information may be used when the tickets are validated and cashed out or redeemed in some other manner. The CVTs 60 and 70 may store the information for the ticket vouchers printed by the gaming machines connected to the CVT. For example, CVT 60 stores ticket voucher information for ticket vouchers printed by gaming machines 65, 66, 67, 68, and 69. When a ticket is printed out, ticket information is sent to the CVT using a communication protocol of some type from the gaming machine. For example, the gaming machine may send transaction information to the CVT which is part of the cashless system using the slot data system manufactured by Bally's Gaming Systems (Alliance Gaming Corporation, Las Vegas, Nev.) or the slot acquisition system manufacture by IGT, Reno, Nev.

In this embodiment, when a player wishes to cash out a ticket, the player may redeem vouchers printed from a particular gaming machine at the CVT associated with the gaming machine or any other CVT which is part of the cashless system associated with the CVT. For example, since CVT 60 and CVT 70 are connected as part of a single cashless system to the EZ pay server 10, a player may redeem vouchers or utilize vouchers at the gaming machines, the CVT's (60 or 70), the cashiers (25, 30, 35, and 40) or the wireless cashiers 58. The CVTs, cashiers, wireless cashiers and gaming machines may be referred to as "cashless validation sites." To cash out the ticket voucher, the ticket voucher is validated by comparing information obtained from the ticket with information stored within the CVT. After a ticket voucher has been cashed out, the CVT marks the ticket paid in a database to prevent a ticket voucher with similar information from being cashed multiple times.

Not all cashless systems may utilize CVTs, many of the functions of the CVT may be transferred to the cashless server, including the EZ pay server 10, eliminating the function within the CVT. For instance, the cashless instrument transaction information may be stored in the cashless server instead of the CVT. Thus, the need to store cashless instrument transaction information within the CVT may be eliminated.

In this embodiment using the EZ pay system, multiple groups of gaming machines connected to CVTs are connected together in a cross validation network 45. The cross validation network is typically comprised of one or more concentrators 55 which accepts inputs from two or more CVTs and enables communications to and from the two or more CVTs using one communication line. The concentrator is connected to a front end controller 50 which may poll the CVTs for ticket voucher information. The front end controller is connected to an EZ pay server 10 which may provide a variety of information services for the award ticket system including accounting 20 and administration 15.

In this invention, one hardware and software platform allowing cashless instruments to be utilized at all of the cashless validation sites (e.g. cashier stations, gaming machines, wireless cashiers and CVTs) within a single property and across multiple properties is referred to as a "cashless server". In this embodiment, the EZ pay server 10 may function as the cashless server. Usually, the cashless server is a communication nexus in the cross validation network. For instance, the EZ pay server 10 is connected to the cashiers, wireless devices, remote cashless instrument transaction clearinghouse, CVTs and the gaming machines via the CVTs.

The cross validation network allows ticket vouchers generated by any gaming machine connected to the cross validation to be accepted by other gaming machines in the cross validation network 45. Additionally, the cross validation network allows a cashier at a cashier station 25, 30, and 35 to validate any ticket voucher generated from a gaming machine within the cross validation network 45. To cash out a ticket voucher, a player may present a ticket voucher at one of the cashier stations 25, 30, and 35 or to a game service representative carrying a wireless gaming device for validating ticket vouchers. A more complete discussion of the details of the wireless gaming device 58, including hardware and utilization, are described in copending U.S. patent application Ser. No. 09/544,844 entitled a WIRELESS GAME ENVIRONMENT filed Apr. 7, 2000 by Rowe the entire specification of which is incorporated herein by reference. Information obtained from the ticket voucher is used to validate the ticket by comparing information on the ticket with information stored on one of the CVTs connected to the cross validation network. In addition, when the ticket voucher was issued at another property, the information on the ticket may be stored at the other property. Thus, to validate the ticket voucher, the EZ pay server may have to communicate with the cashless instrument transaction clearinghouse via the remote connection 11 to obtain the information necessary to validate the ticket voucher.

As tickets are validated, this information may be sent to audit services computer 40 providing audit services, the accounting computer 20 providing accounting services or the administration computer 15 providing administration services. In another embodiment, all of these services may be provided by the cashless server including the EZ pay server 10. Examples of auditing services, which may be provided by cashless system software residing on the auditing computer 40 include 1) session reconciliation reports, 2) soft count reports, 3) soft count verification reports, 4) soft count exception reports, 5) machine ticket status reports and 5) security access report. Examples of accounting services, which may be provided by cashless system software residing on the accounting computer 20 include 1) ticket issuance reports, 2) ticket liability reports, expired ticket reports, 3) expired ticket paid reports and 4) ticket redemption reports. Examples of administration services, which may be provided by cashless system software residing on the administration computer 15 include 1) manual ticket receipt, 2) manual ticket report, 3) ticket validation report, 4) interim validation report, 5) validation window closer report, 6) voided ticket receipt and 7) voided ticket report.

Figure 3:
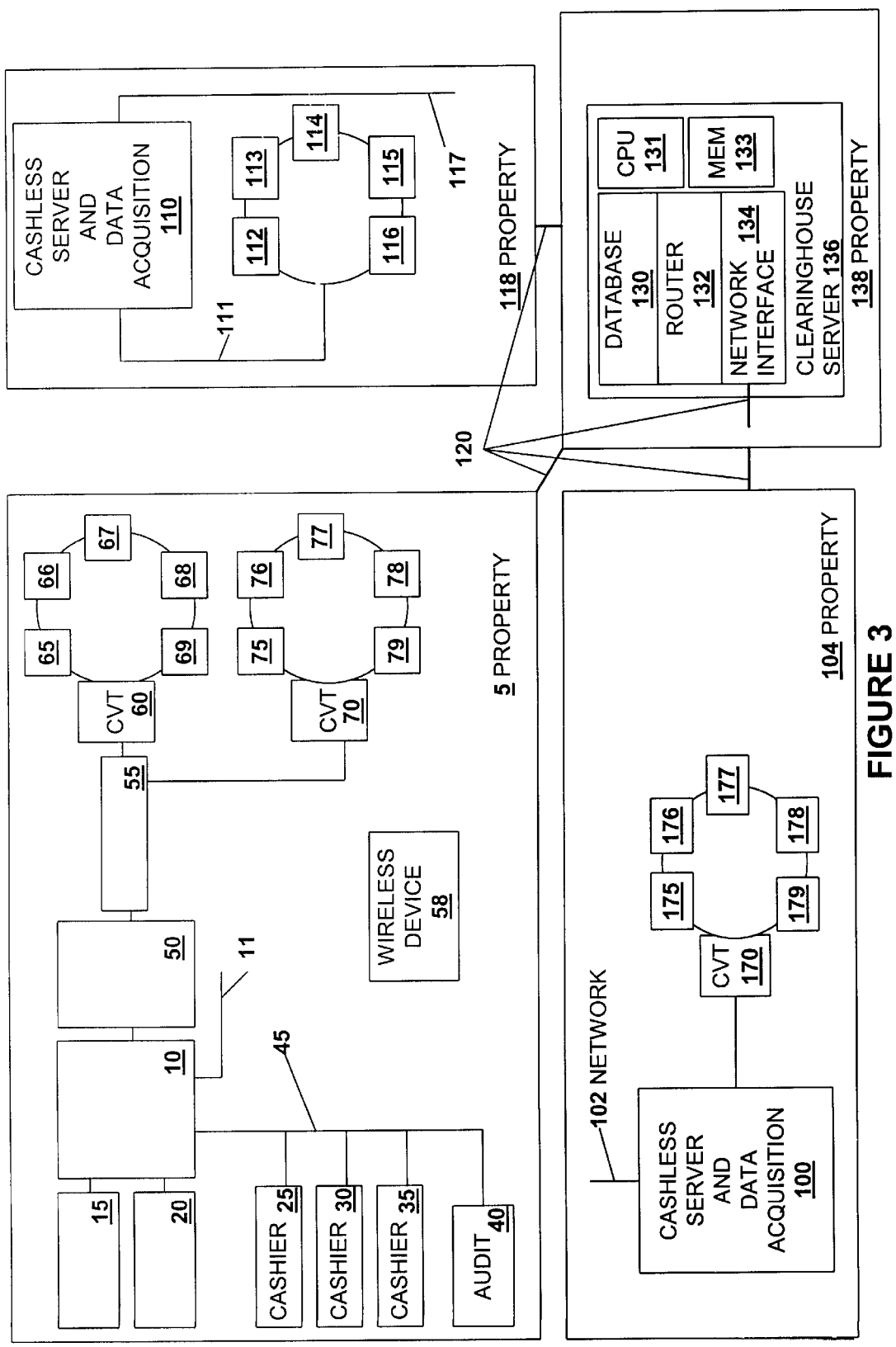
FIG. 3 is a block diagram of cashless systems at multiple properties connected to a cashless instrument transaction clearinghouse server.

FIG. 3 is a block diagram of cashless systems at multiple gaming properties connected to a cashless instrument transaction clearinghouse server. At property 5 (described with reference to FIG. 2), property 104 and property 118, three different embodiments of cashless systems are shown. At property 104, gaming machines 175, 176, 177, 178, 179 send information to the clerk validation terminal 170. The CVT 170 sends information to the cashless server and data acquisition system 100. In this embodiment, the functions of the controller 50 and concentrator 55, as described with reference to FIG. 2, are combined into the cashless server and data acquisition 100. The cashless instrument used on property 104 may be smart cards, magnetic cards, ticket vouchers, combinations of the three or other cashless mediums.

The cashless server 100 contains a communication interface used to send information on cashless instruments generated on property 104 to the clearinghouse server 136 or request information on cashless instruments issued at other properties, including property 5 and property 118, that are being validated at property 104 from the clearinghouse server 136. The cashless instrument transaction information sent to the cashless server 100 from the clearinghouse server 136 and received by the clearing house server from the cashless server 100 is transmitted via the network connection 102. Details of information transmitted between the cashless servers including 10, 100, 110 and the clearinghouse server 136 in regards to multi-property cashless instrument validation are described with reference to FIGS. 4, 5, 6 and 7.

At property 118, gaming machines 112, 113, 114, 115 and 116 are connected to the cashless server and data acquisition system 110 via the local network 111. The local network 111 may be a wireless or wired connection system including fiber, copper or wireless cellular, combinations of all three or other connection systems. A separate CVT is not shown in this embodiment. The functions of the CVT including storage of ticket information may be built into one or more the gaming machines including 112, 113, 114, 115 and 116 or may be built into the cashless server 110. The information sent to the cashless server 100 from the clearinghouse server 136 and received by the clearing house server 136 from the cashless server 100 is transmitted via the network connection 102.

In one embodiment, the clearinghouse server resides on property 138 separate from the other properties, including property 5, property 118 and property 104, containing the cashless servers including 10, 100 and 100. In other embodiments, the clearinghouse server 136 may reside at the same property as one of the cashless servers. Communication between the clearinghouse server 136 and the two or more cashless servers, including cashless servers 10, 100, 110, may be performed via the network connections 120 and the network interface 134 residing within the clearinghouse server 134. The connections between the cashless servers and the clearinghouse server 136 including 11, 102, 117 and 120, may comprise a dedicated communication network.

Components of the cashless instrument transaction clearinghouse server 136 may include 1) a memory storage unit for storing cashless instrument transaction information in a transaction database 130, 2) a functional router 132 enabling communication between the clearinghouse server and different properties, 3) a CPU 131, 4) a memory 133 containing software for implementing the clearinghouse functions and 5) the network interface. The transaction database 130 may contain on-going and past cashless instrument transactions processed using the clearinghouse server 136. The transaction database 130 may be implemented using Microsoft NT (Microsoft, Redmond, Wash.) and SQL (server query language). The cashless servers, including 10, 100 and 110, may also utilize this database technology.

Cashless instrument transaction information for two or more gaming properties may be stored in the clearinghouse server transaction database 130. The properties may be owned by the same or different entities. The transaction database 130 may be accessed remotely by the properties, including 5, 104, and 118, utilizing the clearinghouse server 136. Further, the transaction database 130 may be used with analysis software to analyze transactions routed through the clearinghouse server 136. An transaction analysis interface is described with reference to FIG. 8.

The transaction database 130 may be partitioned to according to properties or ownership of properties to limit access to the database 130. For example, when property 5, property 104 and property 118 are each owned by different entities, each property may only analyze cashless instrument transactions relating to cashless instruments generated and validated at their own property stored at the clearinghouse server 136. Thus, the owners of property 5 may access information relating to cashless instruments generated at property 5 and validated at properties 104 and 118 using the clearinghouse server 136 and the owners of property 5 may access information relating to cashless instruments generated at properties 104 and 118 validated at property 5. However, the owners of property 5 would not be able to access information in the database regarding cashless instruments generated at property 118 and validated at property 104. When more than one property is owned by a single entity, the single entity may be able to access cashless instrument transaction information relating to ownership of all of the properties owned by the single entity. For instance, when the single entity owns properties 5 and 104, the single entity may access the transaction database 130 for transactions relating to cashless instruments generated at properties 5 and 104 and validated at any of the properties using the clearinghouse server 136. Additionally, the single entity may access the transaction database 130 for transactions relating to cashless instruments generated at any of the properties and validated at properties 5 and 104.

The router 132 may contain routing information that allows the clearinghouse server 136 to determine where a cashless instrument was generated. The routing information is used when a cashless instrument is validated at a property different from the property where it was generated. For example, routing information is needed when a cashless instrument is generated at property 5 but the cashless instrument is validated at property 104. Each cashless instrument may be generated with a unique property identifier stored within the cashless instrument. When a validation request for the cashless instrument is received by the clearinghouse server, a property routing table stored within the router may be used by the server to determine where the cashless instrument was generated and communication information allowing the clearinghouse server 136 to communicate with the cashless server where the cashless instrument was generated.

The requirements associated with accounting and reporting of the cashless instrument information are dependent on the regulations within the jurisdiction. That being the case, the system is adaptable to those particular regulations. In general, a cashless instrument with an award amount may be considered to be analogous to a personal check written by the property where it was generated. When the cashless instrument is validated, it is essentially cashed. This implies that the property where the cashless instrument was generated must maintain a database of data related to those cashless instruments that were created on its property. This is analogous to maintaining a bank account whose sole purpose is to cover the cashless instruments that were generated at the property. This property is usually responsible for maintaining its cashless instrument database and validating cashless instruments. When a request to validate a cashless instrument is received by the cashless system at a particular gaming property, the property has the option of validating or rejecting the request. Once the property validates the cashless instrument, it is typically the responsibility of that property to insure its own cashless instrument transaction database is updated. At that time, the property which generated the cashless instrument, now must transfer the funds to the property requesting the validation. The fund transfers may occur with each transaction or could be compiled in a batch to cover multiple ticket validation transactions on a periodic basis, eg. once a night. The cashless instrument transaction clearinghouse facilitates all associated electronic fund transfers (EFTs) and acts as a third party between the parties. Details of these transactions are described with reference to FIGS. 4, 5, 6 and 7.

Figure 4:
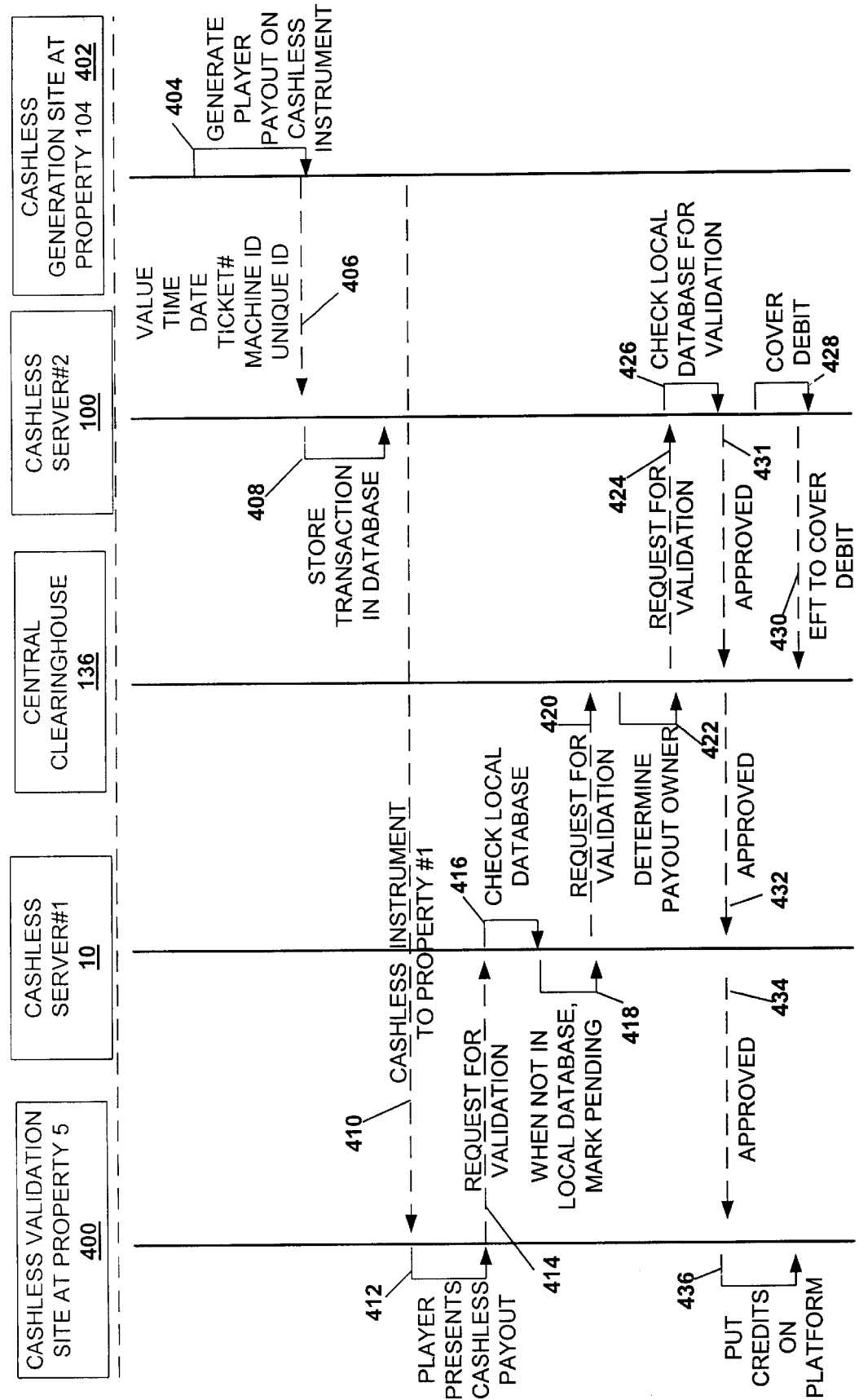
FIG. 4 is an interaction diagram for a cashless instrument transaction between a clearinghouse, cashless servers, and cashless generators/validators where the cashless instrument is generated at a different location from where it is validated.

FIG. 4 is an interaction diagram for a cashless instrument transaction between a clearinghouse, cashless servers, and cashless generators/validators where the cashless instrument is generated at a different location from where it is validated. In 404, a player payout (e.g. award) is generated on a cashless instrument at a cashless instrument generation site 402 at property 100. The cashless instrument generation site may include a gaming machine, a clerk validation terminal, a wireless validation terminal and a cashier station. The cashless instrument may include a printed ticket voucher (e.g. EZ pay ticket), a smart card, a debit card and other cashless mediums. In 406, when the cashless instrument is generated, cashless instrument transaction information, including 1) a value, 2) an issue date, 3) an issue time, 4) a transaction number unique to the transaction, 5) a machine ID that generated the cashless instrument, 6) an issue location and 7) an owner, may be transmitted to the cashless server 100. The cashless instrument transaction information is also stored on the cashless instrument when the cashless instrument is generated in 404. In 408, the cashless server may store the cashless instrument transaction information in a database. The transaction information stored in the database is used when the cashless instrument is validated. The validation process may be invoked when the cashless instrument is redeemed for cash or when the cashless instrument is used in a gaming machine or other device that accepts the cashless instrument. The validation process involves comparing the cashless instrument transaction information stored on the cashless instrument with the cashless instrument transaction information stored in the cashless server database.

In 410, a game player takes the cashless instrument generated at property 100 to property 5. In 412, the game player presents the cashless instrument for a cashless payout at a cashless transaction validation site 400 at property 5. The cashless transaction validation site may include a gaming machine, a cashier station, a clerk validation terminal, a wireless validation device and any other devices which accept cashless instruments. For instance, when a debit card is used as the cashless instrument, the game player may be able to directly deposit the award on the debit card into a bank account accessible to the game player. In 414, a validation request is sent from the cashless transaction validation site 400 to the cashless server 10. The validation request may be an information packet containing the transaction information stored on the cashless instrument in 404 and stored in the cashless server database in 408.

In 416, the cashless server may check the local cashless instrument transaction database on the cashless server to determine if the cashless instrument was generated at property 5. The cashless server may check the local cashless instrument transaction database in a number of ways to determine whether a transaction record for the cashless instrument resides in the database. The database search technique may depend on what information is stored in the local database and what information is stored on the cashless instrument. When the cashless instrument was generated at a property using a different cashless system than the property where the cashless instrument is validated, the type and amount of cashless instrument transaction information stored on the cashless instrument may differ from the type and amount of cashless instrument transaction information stored on the local cashless instrument transaction instrument database. Thus, the search technique may depend on determining a common set of transaction information stored on the cashless instrument being validated and stored in the cashless instrument transaction database. For instance, when the cashless instrument contains a machine ID and the cashless instrument transaction database stores a list of all the local machine IDs, the cashless server 10 may search the local cashless instrument transaction database to determine whether the cashless instrument was generated on one of the local machines at the property 5. As another example, when the cashless instrument contains transaction information on the property where the cashless instrument was generated or the owner of the cashless instrument (e.g. the owner of the property), the cashless server 10 may quickly determine whether the cashless instrument was generated at the local property 5.

In 418, when the cashless instrument was not generated locally, the cashless server may mark the validation request pending in a local database and send a request for validation to the central clearinghouse in 420. The request for validation from the cashless server 10 to the cashless instrument transaction clearinghouse 136 may contain all or some subset of the information stored on the cashless instrument being validated. In addition, the request for validation may contain information about the cashless transaction validation site. For example, the identification information about the cashless transaction validation site 400, the property 5 where the cashless transaction validation site is being validated and the owner of the property may be included in the request for validation message.

As in 414, the request for validation in 420 may be an information packet of some type sent using a pre-determined communication protocol between the cashless server 10 and the central clearinghouse 136. The communication protocol used to transmit transaction information between the cashless transaction validation site 400 and the cashless server 10 in 414 may be the same or different than the communication protocol used to transmit the transaction information between the cashless server 10 and the cashless instrument transaction clearinghouse 136 in 420.

In 422, the cashless instrument transaction clearinghouse determines the owner of the cashless instrument (e.g. the property where the cashless instrument was generated). The clearinghouse 136 determines the owner based upon information received in the validation request in 420 and based upon information stored in the clearinghouse 136. In 424, using routing information stored within the clearinghouse 136, a request for validation is sent from the clearinghouse 136 to the property where the cashless instrument was generated (i.e. property 104 in this embodiment). The request for validation is an information packet in a communication protocol of some type. The transaction information contained within the information packet is sufficient to allow the cashless server 100 at the cashless generation site 402 at property 104 to validate the cashless instrument. The communication protocol used to transmit the transaction information between the cashless server 10 and the clearinghouse 136 in 420 may be the same or different than the communication protocol used to transmit the transaction information between the cashless instrument transaction clearinghouse 136 and the cashless server 100 in 424. For example, the communication protocols may be different when the cashless system used at property 5 is different from the cashless system used at property 104.

In 426, the cashless server 100 checks the local cashless instrument transaction database to confirm the request for validation received in 424 is valid. When the transaction is valid (e.g. the cashless instrument was generated at property 104 and has not been previously validated), in 431, an approval message may be sent from the cashless server 100 to the clearinghouse 136, in 432, the clearinghouse may forward or generate the approval message to the cashless sever 10, in 434, the cashless server 10 may forward or generate the approval message to the cashless transaction validation site 400. In 428, the cashless server may cover the debit by allocating or transferring funds to an account used to cover debits. In 430, the cashless server 100 may send an Electronic Fund Transfer (EFT) to cover the debit to the clearinghouse 136. The EFT may be sent after each transfer or may be sent as a batch at the end of some time period, e.g. at the end of each day.

In 436, the validation site 400 at property 5, performs an appropriate operation when the validation is approved. For example, when the validation site 400 is a gaming machine, credits may be posted on the gaming machine. As another example, when the validation site 400 is a cashier station, the player may receive a cash amount according to the value of the cashless instrument.

One advantage of using a cashless system with EFT is that nothing physical has to be exchanged between the properties. When a token is issued as a credit of indicia at one property and then used at a second property, the second property may allow the token to be used as credit of indicia at the second property. However, the tokens must be counted at the second property and then shipped back to the first property and counted so that the second property may receive the amount of money associated with the token. For many properties accepting tokens from many different properties, the infrastructure associated with the counting, sorting and shipping of tokens from one property to another may be quite large. This type of infrastructure may reduced or eliminated using the cashless instrument transaction clearinghouse with EFT between various properties connected to the clearinghouse.

Besides cashless instrument validations for payout, in another embodiment, the cashless validation processes described above using the cashless instrument transaction clearinghouse may be used to run promotions or complimentary promotions across multiple properties. For example, a promotion could be targeted for a specific type of gaming machine or game theme whereby the player would receive a cashless instrument such as a bar coded ticket from the gaming machine during game play. This bar coded ticket could be redeemed at any of the participating properties linked by the cashless instrument transaction clearinghouse. The bar coded ticket may be redeemed for merchandise or game play credit—whichever is defined as the promotion and printed on the ticket. Further, the ticket may be generated by the gaming machine to entice the player to redeem the ticket at a specific property connected to the cashless instrument transaction clearinghouse. As described above, ticket validation is performed at the gaming property to verify that the ticket is a valid promotional or complimentary ticket. Rather then being limited to a single property, the cashless instrument transaction clearinghouse manages the promotions across the properties and maintains a centralized database containing the promotion theme parameters and the statistics once the game has begun.

In another embodiment, the cashless validation processes described above using the cashless instrument transaction clearinghouse may be used to run multiple progressive games associated with the generation or validation cashless instruments at the gaming machine, each of which is managed and controlled by cashless instrument transaction clearinghouse. These new types of progressive games are associated with either the redemption/validation of a cashless instrument or the generation of a cashless instrument upon cashout. At the time a cashless instrument is inserted into a gaming machine for validation by the system, an event gets transmitted to the cashless instrument transaction clearinghouse whereby the player validating the ticket or other cashless instrument has a chance to win a jackpot. A player may also win a jackpot when a cashless instrument is generated. These jackpot events may be incorporated as part of the cashless instrument generation and validation process as described above with reference to FIG. 4 and as described below with reference to FIGS. 5, 6 and 7.

Similar to a lotto game where a sequence of numbers is used to match a central sequence of numbers in an attempt to win the lotto grand prize, the cashless instrument transaction clearinghouse randomly selects a sequence of numbers which is compared to the transaction validation number stored on the cashless instrument. When these two sequence of numbers match, the player wins the central jackpot and is notified of the win at the gaming machine or the cashless transaction validation site where the cashless instrument is being redeemed. Notification to the player may be made in a number of ways including 1) on the gaming machine's video screen 2) by generating a ticket or other cashless instrument at the gaming machine or other cashless transaction validation site indicating the player has won the jackpot.

The jackpot can be funded in many different ways including, but not limited to: 1) a small percentage of each ticket is held by cashless instrument transaction clearinghouse, e.g. 5 cents of each ticket inserted or cashed out is paid to the cashless instrument transaction clearinghouse for a chance to win the progressive jackpot, 2) each property connected to the cashless instrument transaction clearinghouse pays a small amount (cents) into the progressive jackpot each time the player cashes out or redeems a ticket. In addition, the player may have the option at the gaming machine to play for the progressive jackpot upon cashless instrument generation and cashless instrument validation. Thus, the player may chose to commit a small percentage of the cashless instrument towards winning the jackpot which funds the jackpot.

In general, there may be more then one such progressive jackpot managed by the cashless instrument transaction clearinghouse. With multiple progressive jackpots managed by the clearinghouse, each property may have a small progressive for matching a few numbers in addition to a larger progressive across all properties when all numbers on the ticket are matched. The multiple progressive jackpots may provide more chances for a player to win a jackpot. In addition progressive jackpots may encourage the use of cashless instruments by the game player which as mentioned above many operational advantages to the properties using cashless systems.

Figure 5:
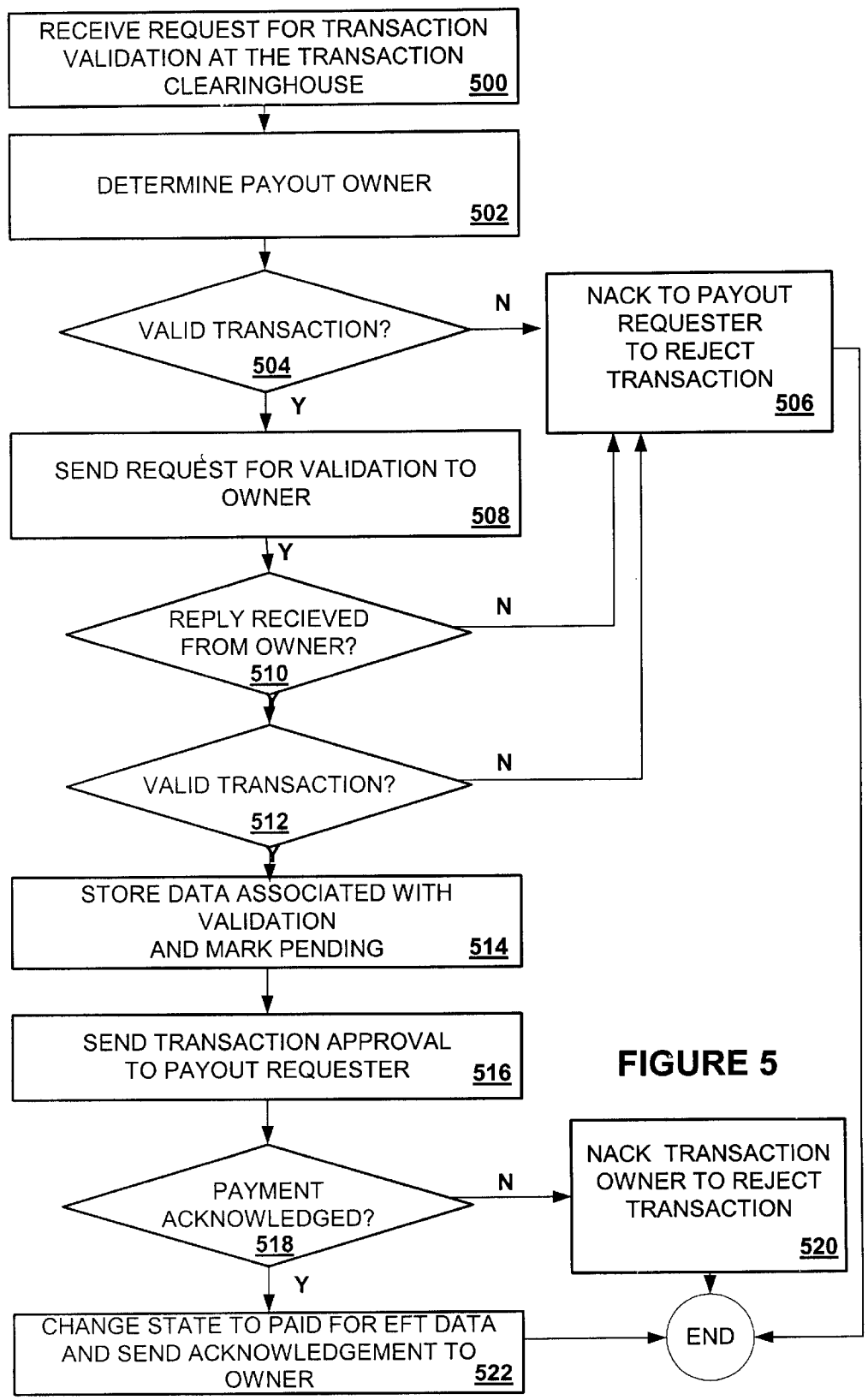
FIG. 5 is a flow chart depicting a method of validating a cashless instrument transaction at a cashless instrument transaction clearinghouse.

FIG. 5 is a flow chart depicting a method of validating a cashless instrument transaction at a cashless instrument transaction clearinghouse. One context of the method of validating the cashless instrument transaction at the cashless instrument transaction clearinghouse is described with respect to FIG. 4. In 500, a request for a cashless instrument transaction validation is received at the clearinghouse 500 from a cashless server. In 502, using information received in the transaction validation request, the clearinghouse determines the transaction owner described in the transaction validation request. In 504, the clearinghouse may determine the validity of the transaction. A transaction may be invalid for a number of reasons including 1) the transaction owner is unknown, 2) the transaction is pending and 3) the transaction has previously been validated. In 506, when the transaction is not valid, a transaction validation reply containing a Non-Acknowledgement (NACK) is sent to the transaction requester of the transaction validation request. The NACK indicates to the transaction requester that the transaction can not be validated at the present time.

In 508, a validation request for the transaction is sent to the cashless server which is the cashless instrument transaction owner determined in 502. In 510, when a validation reply to the validation request is not received by the clearinghouse from the cashless instrument transaction owner, in 506, a transaction validation reply with a NACK is sent to the transaction validation requester. In 512, when a validation reply is received from the cashless instrument transaction owner, the clearinghouse determines whether the validation transaction has been approved or rejected by the cashless instrument transaction owner. A transaction may be rejected for a number of reasons including 1) the cashless instrument has already been validated (e.g. paid), 2) a record of the cashless instrument can not be found and 3) a cashless instrument with transaction information matching the validation request is currently pending. In step 506, when a transaction is rejected, a transaction validation reply with a NACK may be sent to the transaction validation requester.

In 514, when the transaction has been approved by the cashless instrument transaction owner, data associated with the transaction is stored in the clearinghouse database and the transaction is marked pending. While the transaction is pending, the clearinghouse may reject (i.e. 506) validation requests for cashless instruments with transaction information identical to the pending transaction validation request. This operation may be implemented to prevent fraud. In 516, a transaction validation reply with information indicating the requested transaction has been validated is sent from the clearinghouse to transaction validation requester which may be a cashless server. In 518, when the payment of the transaction by the transaction validation requester is not acknowledged in a message of some type, a message containing a NACK may be sent to cashless instrument transaction owner in 520. In 522, when the payment by the transaction validation requester is acknowledged, the state of the transaction is changed from pending to paid and a message may be sent to the owner of the transaction indicating the transaction has been paid. Transaction information stored by the clearinghouse may be used to insure an EFT is made from cashless instrument transaction owner to the cashless instrument transaction validator.

Figure 6:
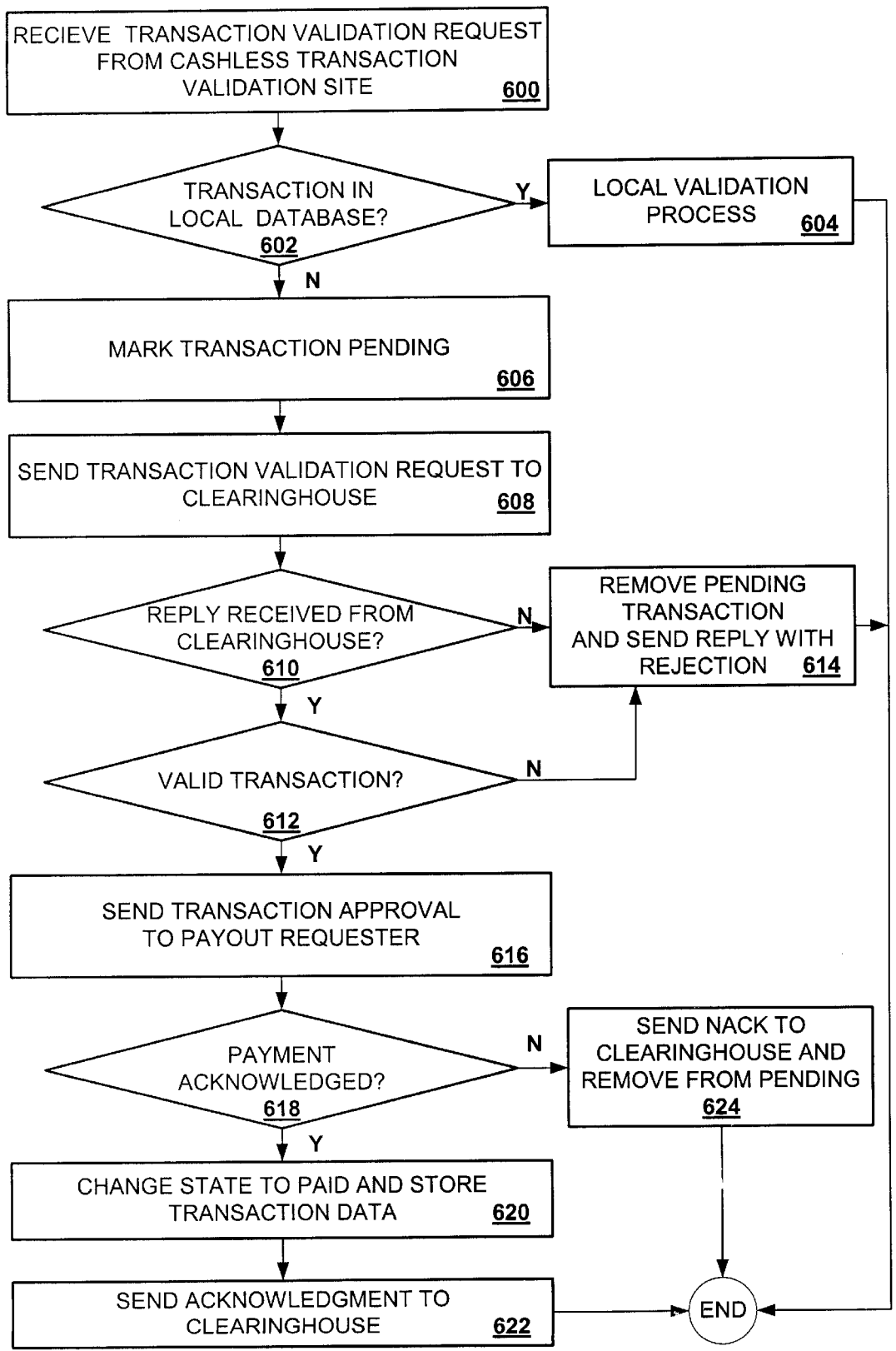
FIG. 6 is a flow chart depicting a method of validating a non-locally owned cashless instrument at a cashless transaction validation site local to the cashless server.

FIG. 6 is a flow chart depicting a method of validating a non-locally owned cashless instrument at a cashless transaction validation site local to the cashless server. One context of the method of validating the non-local cashless instrument transaction at the cashless server is described with respect to FIG. 4. In 600, the cashless server receives a cashless instrument validation request from a cashless transaction validation site. In 602, the cashless server determines the owner of the cashless instrument. When the cashless instrument is locally owned, e.g., the cashless instrument is being validated at the same property where the cashless instrument was generated, a local transaction validation process is used in step 604. One example of a local transaction validation process with respect to a cashless system was described with reference to the EZ pay system in FIG. 1.

In 606, when the cashless instrument transaction owner is non-local, the transaction is marked pending in the cashless server database. In 608, a transaction validation request message containing the cashless instrument transaction information needed to validate the cashless instrument validation request is generated and sent to the cashless instrument transaction clearinghouse. In 610, when a transaction validation reply is not received from the clearinghouse, in 614, the transaction validation request is removed from the queue of pending transaction validation requests, a message containing a transaction rejection is generated and the message rejecting the transaction is sent to the transaction validation site. When a transaction validation reply is received from the clearinghouse, the transaction validation reply typically will contain information regarding whether the requested transaction has been approved or rejected. In 612, when the transaction is rejected, in 614, the transaction validation request is removed from the queue of pending transaction validation requests, a message containing a transaction rejection is generated and the message rejecting the transaction is sent to the transaction validation site.

In 616, when the transaction validation reply approving the transaction validation request is received by the cashless server from the clearinghouse, a transaction approval message may be sent to the cashless transaction validation site that requested the transaction validation in 600. When the execution of the transaction is not acknowledged by the cashless transaction validation site, in 624, the cashless server sends a message to the clearinghouse indicating the transaction has been cancelled and removes the transaction from its queue of pending transactions. In 618, the payment may not be acknowledged for a number of reasons including 1) a communication failure between the cashless transaction validation site and the cashless server, 2) an equipment failure and 3) an operator of the cashless transaction validation site rejects the transaction for some reason. In 620, when the cashless server has received an acknowledgement message from the cashless transaction validation site indicating the cashless instrument transaction has been completed, the state of the transaction is changed from pending to completed (e.g. paid) and information regarding the cashless instrument transaction is stored. In 622, an acknowledgement message indicating the transaction has been completed may be sent to the clearinghouse.

Figure 7:
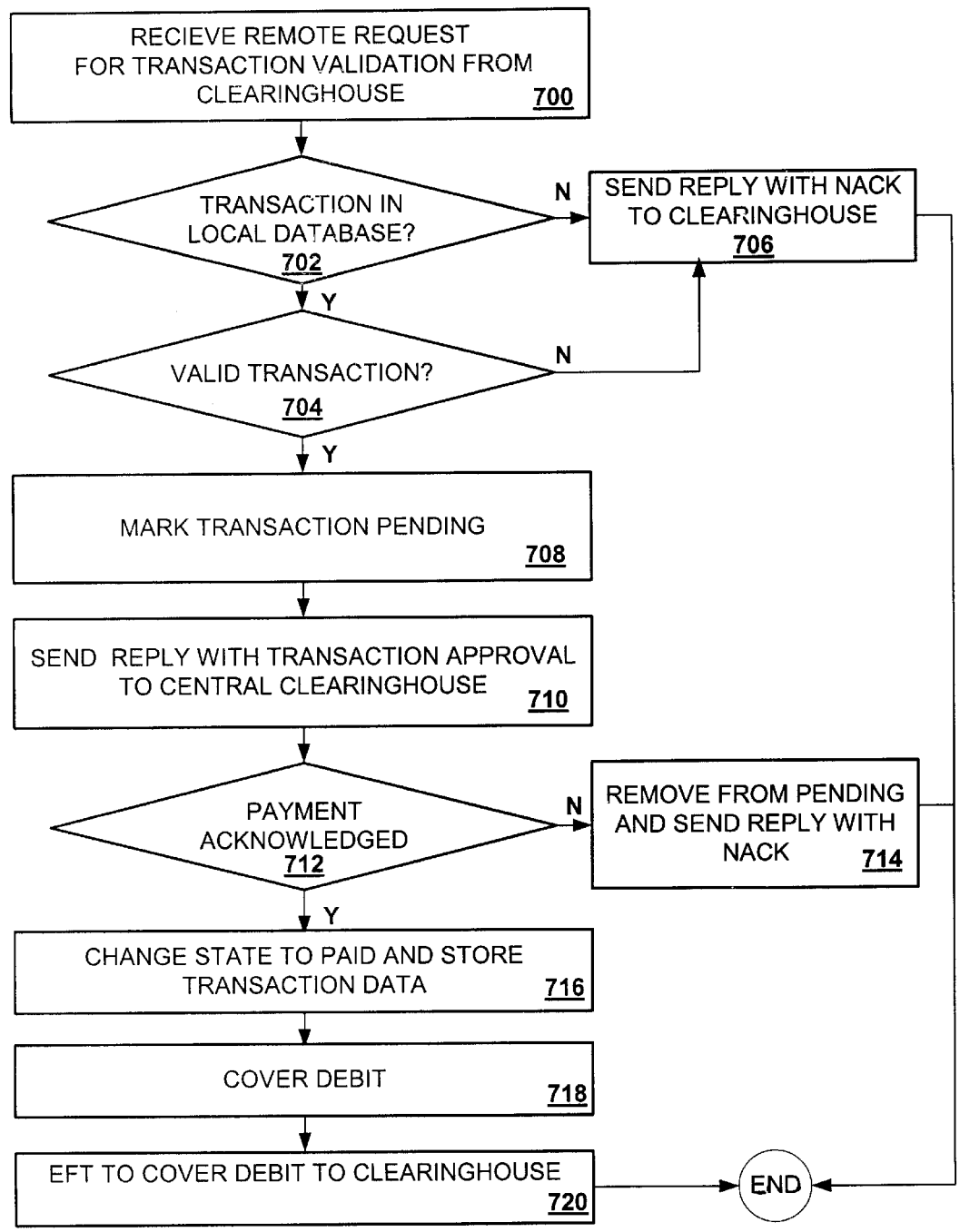
FIG. 7 is a flow chart depicting a method of validating a cashless instrument at a cashless transaction validation site non-local to the cashless server containing a record of the cashless instrument.

FIG. 7 is a flow chart depicting a method of validating a cashless instrument at a cashless transaction validation site non-local to the cashless server containing a record of the cashless instrument. One context of the method of validating a cashless instrument at a cashless transaction validation site non-local to the cashless server containing a record of the cashless instrument is described with respect to FIG. 4. In 700, the cashless server containing the record of the cashless instrument receives a transaction validation request from the cashless instrument transaction clearinghouse. The transaction validation request from the cashless instrument transaction clearinghouse is an information packet that may contain the information needed for the cashless server to validate the transaction.

In 702, using the information contained in the information packet, the cashless server determines whether the transaction has been stored in a database accessible to the cashless server. In 706, when the transaction does not reside in the local database, a non-acknowledgement message indicating the transaction has been rejected is sent to the clearinghouse. In 704, when the transaction resides in the database accessible to the cashless server, the cashless server rejects or approves the transaction. The cashless server may reject a transaction for a number of reasons including 1) the transaction has already been paid and 2) the transaction has been marked pending. When the transaction is rejected, a non-acknowledgement message indicating the transaction has been rejected is sent to the clearinghouse.

In 708, when the transaction has been approved, the cashless server marks the transaction pending in the local database. In 710, the cashless server generates and sends a message to the central clearinghouse where information contained in the message indicates the transaction has been approved. In 712, the cashless server determines whether the payment has been acknowledged. The cashless server may receive an acknowledgement of payment via an acknowledgement message sent by the cashless instrument transaction clearinghouse. Typically, the cashless server may expect an acknowledgement during a fixed period of time. In 714, when the payment of the transaction is not acknowledged by the clearinghouse, the cashless server may remove the pending status of the transaction and send a message to the clearinghouse indicating the transaction is no longer approved.

In 716, when the transaction is approved, the cashless server changes the state of the transaction to paid and stores the transaction data. In 718, as described with reference to FIG. 4, the cashless server covers the debit. In 720, the cashless server may send an EFT to cover the debit, represented by the paid transaction, to the cashless instrument transaction clearinghouse.

Figure 8:
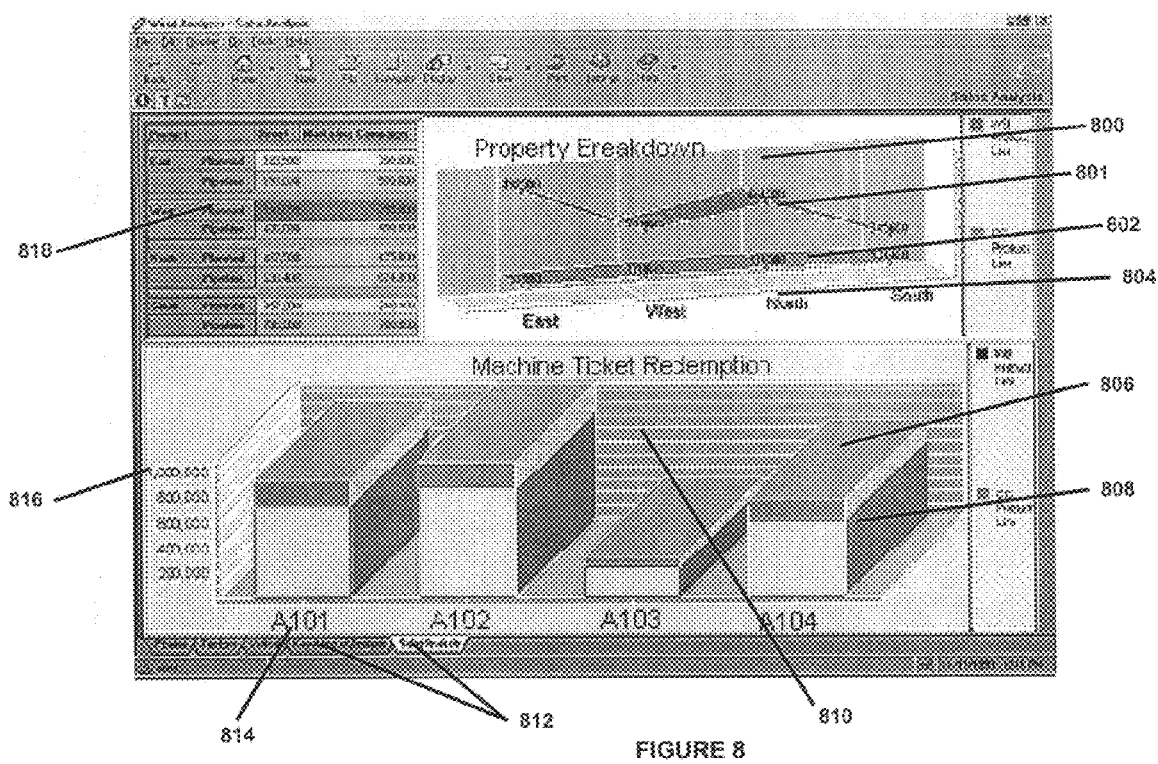
FIG. 8 is a screen shot of a graphical user interface used to analyze cashless instrument transactions in accordance with this invention.

FIG. 8 is a screen shot of a transaction analysis graphical user interface used to analyze cashless instrument transactions that have been processed by a cashless instrument transaction clearinghouse. The transaction analysis graphical user interface (GUI) may provide statistical monitoring for multiple properties connected to the cashless instrument central clearinghouse. With transaction analysis GUI, a user may be able to tract many types of transactions passing through the clearinghouse including 1) transactions relating bar-coded tickets, debit cards and smart cards for cashouts and 2) transactions relating to on-going promotions and compensations (comps) distributed to players. The screen shot is divided into three graphical windows 800, 810 and 818. Each window may contain different visual presentations of data including but not limited to 1) tickets generated, 2) tickets redeemed, 3) flow of tickets from generation to redemption, 4) length of time a ticket is held by a customer, 5) comparison between properties of all ticket statistical data, 6) tickets generated over time by machine, and 7) tickets redeemed overt time by machine (e.g. gaming machine, cashier station, etc.)

In window 800, a breakdown of ticket data for two product lines, including 801 and 802, is plotted for four different properties 804 named North, South, East and West. As mentioned above, access to this information may be limited according to ownership of the properties. In window 818, the numerical values of the data for each property that are graphed in window 800 are displayed as raw data. In window 810, the amount of cashless redemption's for four different gaming machines, including 814, are plotted. The cashless redemption's are broken down according to two different product lines 806 and 808. The values of these product lines were plotted according to property in window 800.

The type of data displayed, the format of the data displayed and the format of the transaction analysis GUI may be easily changed by using the pull downs menus 812 to alternate between graphical displays. In general, all of the statistical information is displayed as raw data, as two dimensional graphs and as three dimensional contour types of graphs representative of ticket transactions or game play. Basic features utilized in the graphical presentation include: titles, X and Y axes scales, data point plotting, shading, horizontal and vertical grid lines, informational messages and data line differentiation.

An advantage of providing a multidimensional view of providing a multidimensional view of multiple property ticket, machine and player related data is that it provides a solid foundation for analytical processing through flexible access to the information of interest to an entertainment corporation operating a number of properties. Operators can visually analyze data across any dimension, at many levels of aggregation, with equal functionality and easy access. The graphical tools provided by the cashless instrument transaction clearinghouse provide views of data in a natural and responsive fashion which is intended to insulate users from complex database query syntax.

Although the foregoing invention has been described in some detail for purposes of clarity of understanding, it will be apparent that certain changes and modifications may be practiced within the scope of the appended claims. For instance, while the gaming machines of this invention have been depicted as having top box mounted on top of the main gaming machine cabinet, the use of gaming devices in accordance with this invention is not so limited. For example, gaming machine may be provided without a top box.

What is claimed is:

1. A cashless instrument transaction clearinghouse for facilitating the use of cashless instruments across separate gaming properties, each of which generates and validates cashless instruments, the cashless instrument transaction clearinghouse comprising:
   a network interface allowing the cashless instrument transaction clearinghouse to communicate with each of the separate gaming properties; and
   a processor configured or designed to (i) receive cashless instrument validation requests via the network interface from a first property for a cashless instrument presented at the first property where the cashless instrument was generated at a second property (ii) send information, via the network, to the second property requesting the second property to approve or reject the cashless instrument validation request.

2. The cashless instrument transaction clearinghouse of claim 1, further comprising a transaction database containing cashless instrument transaction information.

3. The cashless instrument transaction clearinghouse of claim 2, wherein the transaction database is partitioned according to properties.

4. The cashless instrument transaction clearinghouse of claim 3, wherein access to a partition of the transaction database is limited to an owner of the property corresponding to the partition of the transaction database.

5. The cashless instrument transaction clearinghouse of claim 1, wherein the cashless instrument is selected from the group consisting of a smart cart card, a debit card, a bar-coded ticket and an EZ pay ticket voucher.

6. The cashless instrument transaction clearinghouse of claim 1, further comprising a router.

7. The cashless instrument transaction clearinghouse of claim 6, wherein the router contains routing information allowing the processor to determine the property where the cashless instrument was generated.

8. The cashless instrument transaction clearinghouse of claim 6, wherein the router contains routing information allowing the processor to send information to the property where the cashless instrument was generated.

9. The cashless instrument transaction clearinghouse of claim 1, further comprising a memory containing software allowing the processor to operate multiple progressive games associated with cashless instrument transactions across separate gaming properties.

10. The cashless instrument transaction clearinghouse of claim 1, further comprising a memory containing software allowing the processor to operate multiple promotions associated with cashless instrument transactions across the separate gaming properties.

11. The cashless instrument transaction clearinghouse of claim 2, further comprising a memory containing software allowing the processor to graphically analyze the cashless instrument transaction information stored in a transaction database and generate accounting reports based upon the cashless instrument transaction information.

12. The cashless instrument transaction clearinghouse of claim 1, wherein the processor communicates via the network interface with a first cashless system at a first property and a second cashless system at a second property said second cashless system different from said first cashless system.

13. A method of validating a cashless instrument at a first property using a cashless instrument transaction clearinghouse where the cashless instrument was generated at a second property, the method comprising,
   receiving a first transaction validation request containing transaction information from the first property wherein the first transaction validation request requests approval of a cashless instrument transaction;
   sending a second transaction validation request to the second property;
   receiving a first transaction validation reply from the second property; and
   sending a second transaction validation reply to the first property wherein the second transaction validation reply contains transaction information indicating the cashless instrument transaction has been approved or has been rejected.

14. The method of claim 13, wherein the first transaction validation request is an information packet.

15. The method of claim 13, wherein the transaction information is selected from the group a value, an issue date, an issue time, a transaction number, a machine identification number, an issue location, an owner, a transaction approval and a transaction rejection.

16. The method of claim 13, further comprising:
generating a sequence of one or more random numbers;
comparing the sequence of random numbers to a sequence of numbers contained within the transaction information;
when the sequence of random number matches the sequence of numbers contained within the transaction information, generating an award message indicating a prize has been awarded; and
sending the award message to the first property.

17. The method of claim 13, further comprising:
when the cashless instrument transaction is approved, charging an amount to property owner.

18. The method of claim 13, further comprising:
when the cashless instrument transaction is approved, deducting a percentage of a value contained on the cashless instrument and storing the percentage of the value in a transaction database.

19. The method of claim 13, further comprising:
when a cashless instrument transaction is approved, storing transaction information to a transaction database.

20. The method of claim 13, further comprising:
generating a transaction validation reply.

21. The method of claim 13, further comprising:
generating a transaction validation request.

22. The method of claim 13, further comprising
determining the property where the cashless instrument was generated from the transaction information.

23. The method of claim 13, wherein the first property uses a first cashless system and the second property uses a second cashless system, said first cashless system different from said second cashless system.

24. The method of claim 13, wherein the first property uses a first cashless system and the second property uses a second cashless system, said first cashless system the same as said second cashless system.

25. The method of claim 23, wherein the first cashless system or the second cashless system is an EZ pay award ticket system.

26. The method of claim 13, wherein a first owner of the first property is different from a second owner of the second property.

27. The method of claim 13, wherein a first owner of the first property is the same as a second owner of the second property.

28. The method of claim 13, wherein the cashless instrument is selected from the group consisting of a smart cart card, a debit card, a bar-coded ticket and an EZ pay ticket voucher.

29. The method of claim 13, wherein the cashless instrument validation request is received from a cashless server.

30. A method of validating a cashless instrument presented at a first property using a cashless server at the first property connected to a cashless instrument transaction clearinghouse where the cashless instrument was generated at a second property, the method comprising:
sending a transaction validation request containing transaction information to the cashless instrument transaction clearinghouse wherein the transaction validation request requests approval of the cashless instrument transaction at the cashless transaction validation site; and
receiving a transaction validation reply from the cashless instrument transaction clearinghouse wherein the transaction validation reply contains information indicating the cashless instrument transaction has been approved or has been rejected.

31. The method of claim 30, further comprising:
receiving a first transaction validation request containing transaction information from a cashless instrument transaction validation site on the first property wherein the first transaction validation request requests approval of a cashless instrument transaction.

32. The method of claim 31, wherein the cashless instrument validation site is selected from the group consisting of a gaming machine, a cashier station, a wireless validation device and a clerk validation terminal.

33. The method of claim 30, further comprising:
sending a second transaction validation reply to the cashless instrument validation site wherein the second transaction validation reply contains information indicating the cashless instrument transaction has been approved or has been rejected.

34. The method of claim 30, further comprising:
sending an acknowledgement message to the cashless instrument transaction clearinghouse when the cashless instrument transaction is completed at a cashless instrument transaction validation site.

35. The method of claim 30, further comprising:
sending a non-acknowledgement message to the cashless instrument transaction clearinghouse when the cashless instrument transaction is rejected at a cashless instrument transaction validation site.

36. The method of claim 30, further comprising:
storing cashless instrument transaction data.

37. The method of claim 30, wherein the cashless instrument is selected from the group consisting of a smart cart card, a debit card, a bar-coded ticket and an EZ pay ticket voucher.

38. A method of validating a cashless instrument presented at a first property using a cashless server at a second property connected to a cashless instrument transaction clearinghouse where the cashless instrument was generated at the second property, the method comprising,
receiving a transaction validation request from the cashless instrument transaction clearinghouse wherein the transaction validation request requests approval of the cashless instrument transaction at the cashless transaction validation site; and
sending a transaction validation reply containing transaction information to the cashless instrument transaction clearinghouse wherein the transaction validation reply contains transaction information indicating the cashless instrument transaction has been approved or has been rejected.

39. The method of claim 38, further comprising:
sending an electronic fund transfer to the cashless instrument transaction clearinghouse.

40. The method of claim 38, further comprising:
receiving an acknowledgement message from the cashless instrument transaction clearinghouse when the cashless instrument transaction is completed at the first property.

41. The method of claim 38, further comprising:
sending a non-acknowledgement message to the cashless instrument transaction clearinghouse when the cashless instrument transaction is rejected at the cashless server.

42. The method of claim 38, further comprising:
storing cashless instrument transaction data.

43. The method of claim 38, wherein the cashless instrument is selected from the group consisting of a smart cart card, a debit card, a bar-coded ticket and an EZ pay ticket voucher.

44. The method of claim 38, further comprising:

searching a transaction database.

45. The method of claim 38, further comprising:

determining the validity of a cashless instrument transaction.

* * * * *